United States Patent
Perrier

(10) Patent No.: US 10,989,557 B2
(45) Date of Patent: Apr. 27, 2021

(54) METHOD AND DEVICE FOR CONTROLLING THE TRANSMISSION OF DATA FROM A VEHICLE TO COMMUNICATION EQUIPMENT

(71) Applicant: PSA Automobiles SA, Poissy (FR)

(72) Inventor: Lionel Perrier, Versailles (FR)

(73) Assignee: PSA AUTOMOBILES SA, Poissy (FR)

( * ) Notice: Subject to any disclaimer, the term of this patent is extended or adjusted under 35 U.S.C. 154(b) by 30 days.

(21) Appl. No.: 16/605,756

(22) PCT Filed: Mar. 23, 2018

(86) PCT No.: PCT/FR2018/050718
§ 371 (c)(1),
(2) Date: Oct. 16, 2019

(87) PCT Pub. No.: WO2018/197766
PCT Pub. Date: Nov. 1, 2018

(65) Prior Publication Data
US 2020/0124436 A1    Apr. 23, 2020

(30) Foreign Application Priority Data

Apr. 27, 2017    (FR) ...................... 1753710

(51) Int. Cl.
*G01C 21/36*    (2006.01)
*H04W 4/40*     (2018.01)
*G01C 21/34*    (2006.01)

(52) U.S. Cl.
CPC ..... *G01C 21/3617* (2013.01); *G01C 21/3484* (2013.01); *G01C 21/3492* (2013.01); *G01C 21/3626* (2013.01); *H04W 4/40* (2018.02)

(58) Field of Classification Search
CPC ............ G01C 21/3617; G01C 21/3484; G01C 21/3492; G01C 21/3626; H04W 4/40
See application file for complete search history.

(56) References Cited

U.S. PATENT DOCUMENTS 6,064,941 A * 5/2000 Nimura .............. G01C 21/3682
                                                                701/416
9,558,664 B1    1/2017 Gaebler et al.
(Continued)

FOREIGN PATENT DOCUMENTS

CN          105138779 A    12/2015

OTHER PUBLICATIONS

International Search Report for PCT/FR2018/050718 dated Jun. 11, 2018.
Written Opinion for PCT/FR2018/050718 dated Jun. 11, 2018.

*Primary Examiner* — Behrang Badii
(74) *Attorney, Agent, or Firm* — Sandberg Phoenix & von Gontard, P C.

(57) ABSTRACT

A method is dedicated to controlling data transmission by waves from a vehicle (V) to communication equipment (EC), and comprises a first step in which the most frequently taken reference route is determined in the vehicle (V) for a selected duration, then a definition of this reference route is transmitted, and a second step, in which each new route taken is compared, in the vehicle (V), to the reference route, and, in the event of a difference, a definition of this new route is transmitted with predefined data of the vehicle (V) that is recorded during this new route, whereas in the event of identity, information is transmitted that represents the fact that the reference route has been taken again and the predefined data of the vehicle (V) recorded during the reference route that has been taken again is deleted in the vehicle (V).

10 Claims, 1 Drawing Sheet

(56) References Cited

U.S. PATENT DOCUMENTS

| | | |
|---|---|---|
| 2008/0162034 A1 | 7/2008 | Breen |
| 2013/0031047 A1 | 1/2013 | Boazi et al. |
| 2014/0278051 A1* | 9/2014 | McGavran ............. G06N 20/00 701/400 |
| 2015/0300825 A1* | 10/2015 | Manoliu ................... B60T 7/12 701/36 |
| 2017/0207963 A1* | 7/2017 | Mehta ............... H04M 1/72519 |
| 2017/0313332 A1* | 11/2017 | Paget ................ H04N 5/23203 |
| 2018/0120856 A1* | 5/2018 | Gabardos ............. G05D 1/0088 |

* cited by examiner

METHOD AND DEVICE FOR CONTROLLING THE TRANSMISSION OF DATA FROM A VEHICLE TO COMMUNICATION EQUIPMENT

CROSS-REFERENCE TO RELATED APPLICATIONS

This application is the US National Stage under 35 USC § 371 of International Application No. PCT/FR2018/050718, filed 23 Mar. 2018 which claims priority to French Application No. 1753710 filed 27 Apr. 2017, both of which are incorporated herein by reference.

BACKGROUND

The invention relates to vehicles which are equipped with a communication module capable of establishing communications by broadcast waves (or wirelessly) with at least one communication network, and more specifically the control of the transmission by broadcast waves of data of such vehicles to at least one unit of communication module.

Certain vehicles, generally of the automotive type, comprise a communication module responsible, in particular, for transmitting to communication equipment (such as, for example, a server), possibly periodically, data which concern the vehicle and/or which concern its environment. Generally, the vehicle data that are transmitted are at least part of the data circulating in its on-board communication network (possibly of the multiplexed type), to which most of its electronic equipment is connected.

The data transmitted by the vehicles are temporarily stored in order to be analyzed in order to deduce a lot of information on the operation of the vehicles, possibly depending on their environment (in particular the climate), and/or on the traffic lanes used by the vehicles (in particular the traffic according to the days and/or schedules) and/or on the habits or preferences of the drivers.

The quantity of data transmitted by the vehicles being very significant, the vehicle requires storage memories of very large capacity, and very significant analysis and data processing capabilities, which is very expensive. In addition, the transmission of such vehicle data consumes a large bandwidth of wireless communication networks, which can, sometimes and in some areas, limit third-party communications by broadcast waves.

It is known that much of the data is recurrent and therefore redundant for the same vehicle. This is, for example, the case for data which are recorded on the same route frequently taken for a given vehicle (for example, between the driver's home and the driver's place of work, or a parking area close to a means of transport used by its driver to reach his place of work). As a result, a large amount of vehicle data are transmitted, stored, analyzed and processed unnecessarily.

Chinese Pat. No. CN105138779 describes a method for optimizing certain data of a vehicle according to each route that the vehicle takes, in order to transmit only the optimized data of each route. Unfortunately, this only reduces the amount of data transmitted very slightly, and does not prevent the transmission of redundant data.

SUMMARY

The object is, in particular, to improve this situation.

To this end, a method is disclosed which is dedicated to the control of the transmission of data of a vehicle to communication equipment by broadcast waves.

This control method is characterized in that it comprises:
a first step in which a reference route taken most frequently is determined in the vehicle during a selected period of time, and then at least one definition of this reference route is transmitted by broadcast waves from the vehicle to the communication equipment, and
a second step in which, in the vehicle, each definition of a new route taken by the latter is compared to the definition of the reference route, and if there is a difference, the definition of the new route, with the pre-defined data of the vehicle recorded during this new route, is transmitted by way of broadcast waves to the communication equipment, while in case of identical data, what is transmitted from the vehicle to the communication equipment is first information representative of the fact that the reference route has been used once again and the predefined data recorded during the reference route taken again is deleted in the vehicle.

Thus, it is possible to very significantly reduce the amount of data that is transmitted by broadcast waves from a vehicle to remote communication equipment (such as, for example, a server).

The monitoring assistance method may comprise other features that may be considered separately or in combination, and in particular:
the first information can only signal that the reference route has been used again;
in the second step, a second information can also be determined that is representative of a repeatability rate updated each time the reference route has been used again;
the repeatability rate may be equal to a ratio $a/(a+b)$, where a is equal to the product of the number of times the reference route has been taken multiplied by the length of the latter, and b is equal to the sum of a and the sum of the number of times each route different from the reference route has been taken multiplied by the length of that different route;
in the second step, when the communication equipment receives the second information from the vehicle, it can store the second information matched with an identifier of the vehicle;
each definition of a route may include a starting geographical position of the route, a geographical end position of the route, a route length, and an average vehicle speed on that route;
the chosen duration can be between two weeks and four weeks. For example, the chosen duration can be equal to three weeks.

A device for controlling the transmission of data from a vehicle to communication equipment is also proposed.

This monitoring device is characterized by the fact that it comprises:
analysis means arranged to determine, in the vehicle, for a selected time period, a reference route taken most frequently, and to trigger the transmission by broadcast waves, from the vehicle to the communication equipment, of at least one definition of this reference route, and
control means arranged to compare, in the vehicle, each definition of a new route taken by the vehicle with the definition of the reference route, and in case of difference, to trigger the transmission by broadcast waves, from the vehicle to the communication equipment, of the definition of the new route with predefined vehicle data recorded during this new route, and if these are identical, to trigger the transmission by broadcast waves, from the vehicle to the communication equipment, of first information representative of the fact that the reference route was once again used, and the deletion in the vehicle of the predefined vehicle data recorded during the reference route once again used.

Also disclosed is a vehicle, possibly of the automobile type, comprising a monitoring device of the type presented above.

DESCRIPTION OF THE FIGURES

Other features and advantages of the invention will appear upon examination of the detailed description below, and the attached drawings, in which.

DETAILED DESCRIPTION

The object is, in particular, to propose a monitoring method, and an associated monitoring device, for enabling the monitoring of the transmission of data of a vehicle V by broadcast waves to at least one piece of communication equipment EC.

In the following, and by way of a non-limiting example, the vehicle V is considered to be of the automobile type. This may be a car, for example. However, the method is not limited to this type of vehicle. It concerns any type of land, sea (or river) or air vehicle, since it includes a wireless communication module.

Figure 1:
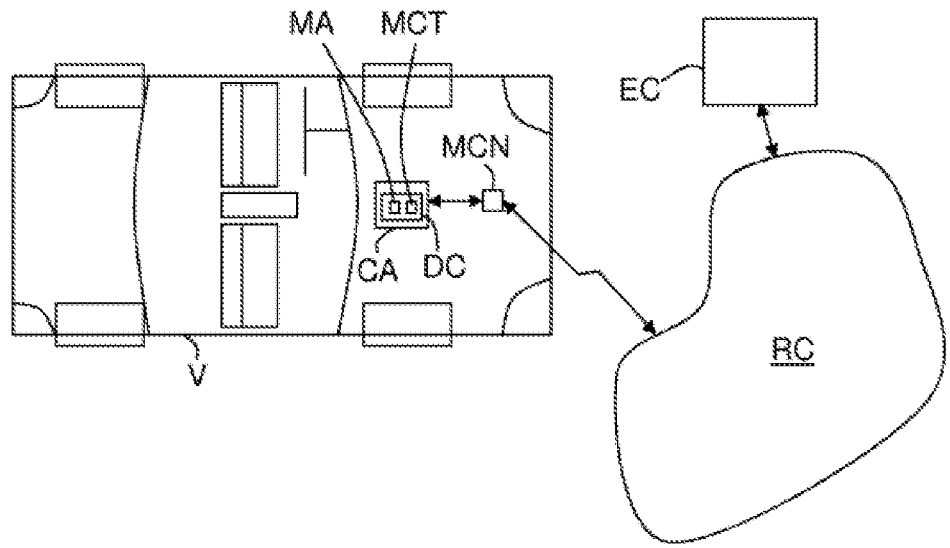
FIG. 1 schematically illustrates, in a perspective view, an exemplary vehicle comprising a monitoring device according to the invention and a wireless communication module connected to a wireless communication network, and FIG. 2 schematically illustrates an exemplary algorithm implementing a monitoring method for monitoring the transmission by broadcast waves of data of a vehicle to a piece of communication equipment.

FIG. 1 diagrammatically shows an exemplary vehicle V comprising a monitoring device DC and a wireless communication module MCN that can connect to a wireless communication network RC, allowing access to a piece of communication equipment EC responsible for storing, analyzing and processing vehicle data.

For example, this communication equipment EC can be a server.

As indicated above, it is proposed, in particular, to implement a method for monitoring the transmission by broadcast waves of data from a vehicle V to at least one piece of communication equipment EC. This implementation can be performed by means, in particular, of control devices DC which are installed respectively in vehicles V which are arranged to transmit, possibly periodically, some of their data to the communication equipment EC.

For example, these data of the vehicle V which are transmitted, relate to the operation and/or the environment of the vehicle. By way of example, these data are at least part of those which circulate in the communication network (possibly of the multiplexed type) which is on-board the vehicle V and to which most of the electronic equipment of the vehicle is connected.

In the example illustrated in a non-limiting manner in FIG. 1, the control device DC of the vehicle V is installed in a computer CA which may provide at least one other function within this vehicle V. This computer CA can, for example, be a telematic box (possibly the one known under the French acronym BSRF (for "Radio Frequency Servo Case")). However, this is not mandatory. Indeed, the control device DC could be arranged in the form of a computer dedicated to controlling the transmission of data by broadcast waves from the vehicle V. Therefore, a control device DC can be realized in the form of software modules, or as a combination of electronic circuits (i.e., as hardware) and software modules.

The (control) method comprises first and second steps.

The first step is triggered at the beginning of the use of the vehicle V by a driver, for example when the vehicle is first put into traffic. This triggering can possibly take place by selection from a menu displayed on a screen (for example that of the central handset).

During the first step of the method, a most frequently used reference route is first determined in the vehicle V for a selected time period. This determination is performed by analysis means MA that include the monitoring device DC. It is done by recording the definition of each route taken by the vehicle V during the chosen duration, then comparing all these definitions with each other.

For example, in a non-limiting manner, the chosen duration can be between two weeks and four weeks. As a purely illustrative example, this chosen duration may be equal to three weeks. But when the vehicle V is little used, the duration chosen may be a function of a minimum number of trips.

Also for example, and in a non-limiting manner, each definition of a recorded route may comprise the geographical position of the beginning of this route, the geographical position of the end of this route, the length of this route, and the average speed of the vehicle V on this route. This definition here comprises four parameters. However, it could have only two or three parameters or more than four parameters (for example five or six parameters).

Note that it is preferable to consider that one route is identical to another route when the routes have the same definition with a deviation tolerance of x % for at least one of the parameters constituting the definition. This results from the fact that there may be a slight variability of at least one parameter for the same route (thus, two paths may be identical by having slightly different starting or ending geographical positions, for example because of slightly different parking spaces, or being of slightly different lengths, for example due to construction or a delivery or a detour).

This deviation tolerance of x % may possibly be adjustable.

Frequently, the reference route is the route between the driver's home and his place of work or a parking area close to a means of transport used by the driver to reach his place of work), and vice versa.

It will also be noted that during the chosen duration for determination of the reference route, each time a route of the vehicle V is completed, the definition of this route as well as the predefined data for this vehicle V as recorded during this new route (and more precisely its communication module MCN) are transmitted by broadcast waves, to the communication equipment EC.

Then, in the first step, once the definition of the reference route is available, at least this definition of the reference path which has just been determined is transmitted from the vehicle V (and more precisely its communication module MCN) by broadcast waves to the communication equipment EC. This transmission is triggered by the analysis means MA of the monitoring device DC, and is carried out by the communication module MCN of the vehicle V.

During the second step of the method, in the vehicle V each definition of a new route taken by vehicle V is compared to the definition of the reference route that was previously determined in the first step. This comparison of definitions of the routes is performed by control means MCT included in the monitoring device DC, taking into account possible deviation tolerances on the parameters of the definitions.

If there is a difference between the definitions of the new route and the reference route, the transmission from the vehicle V to the communication equipment EC of the definition of the new route with predefined data of the vehicle V which have been recorded during this new route, is completed by way of broadcast waves.

Conversely, in case of identity between the definitions of the new route and the reference route, the first information i1, which is representative of the fact that the reference route was used again is transmitted by broadcast waves from the vehicle V to the communication equipment EC, and the predefined data of vehicle V, which were recorded during the reference route which is used again, are deleted in the vehicle V.

It will be understood that it is the monitoring means MCT of the monitoring device DC which trigger one or the other of the transmissions according to the result of the comparison of definitions, and that the transmission is carried out by the communication module MCN of the vehicle V.

Using the invention, only the predefined data of vehicle V which have been recorded during a different route from the reference route are transmitted to the communication equipment EC. It is considered that it would be redundant, and therefore unnecessary, to retransmit the predefined data of vehicle V recorded during each newly used reference route, since these data have already been transmitted. For example, about 70% to 80% of trips made by a person still working in the same place are repetitive.

The invention therefore makes it possible to very significantly reduce the amount of data from vehicle V that is transmitted to the communication equipment EC, and also to reduce the capacity of the storage memories and the analysis and data processing capabilities of at least the communication equipment EC.

In addition, this significantly reduces the bandwidth of wireless communication networks used to transmit the data of the vehicles, and the cost of data feedback.

For example, the first information i1 may signal that the reference route has been used again. Alternatively, the first information i1 could be the last update of the total number of times that the reference route was taken by the vehicle V.

Note that in the second step of the method, it is possible to determine a second item of information i2 representative of a repeatability rate tr updated each time the reference route has been used again.

By way of non-limiting example, the repeatability rate tr can be equal to a ratio a/(a+b), where a is equal to the product of the number of times $n_{TR}$ the reference route was taken multiplied by the length $l_{TR}$ of the reference route, and b is equal to the sum of a and the sum of the number of times $n_{Tj}$ each route different from the reference route has been taken, multiplied by the length $l_{Tj}$ of this different route. We have here $tr=(n_{TR}*l_{TR})/[(n_{TR}*l_{TR})+\Sigma_j(n_{Tj}*l_{Tj})]$.

Alternatively, the repetition rate tr could be equal to the ratio a'/(a'+b'), where a' is equal to the number of times $n_{TR}$ the reference route has been taken, and b' is equal to the sum of a and the sum of the number of times $n_{Tj}$ each route different from the reference route has been taken. Then we have $tr=n_{TR}/[n_{TR}+\Sigma_j n_{Tj}]$.

This second information i2 may, for example, be determined by the monitoring device means MCT of the monitoring device DC of vehicle V, and then transmitted to the communication equipment EC by the communication module MCN of vehicle V. Alternatively, the second information i2 can be determined by the communication equipment EC from, in particular, the first information i1 and the route definitions transmitted to the communication equipment EC by the communication module MCN of vehicle V.

Note also that in the second step of the method, when the communication equipment EC receives the second information i2 of a vehicle V, it can store the second information i2 matched to an identifier of vehicle V. In this case, it may, for example, be more advantageous for the person who analyzes the vehicle data to select for analysis the data transmitted by the vehicle having the identifier stored matched with the lowest repeatability rate tr, because these data will, a priori, offer the greatest diversity of situations.

Figure 2:
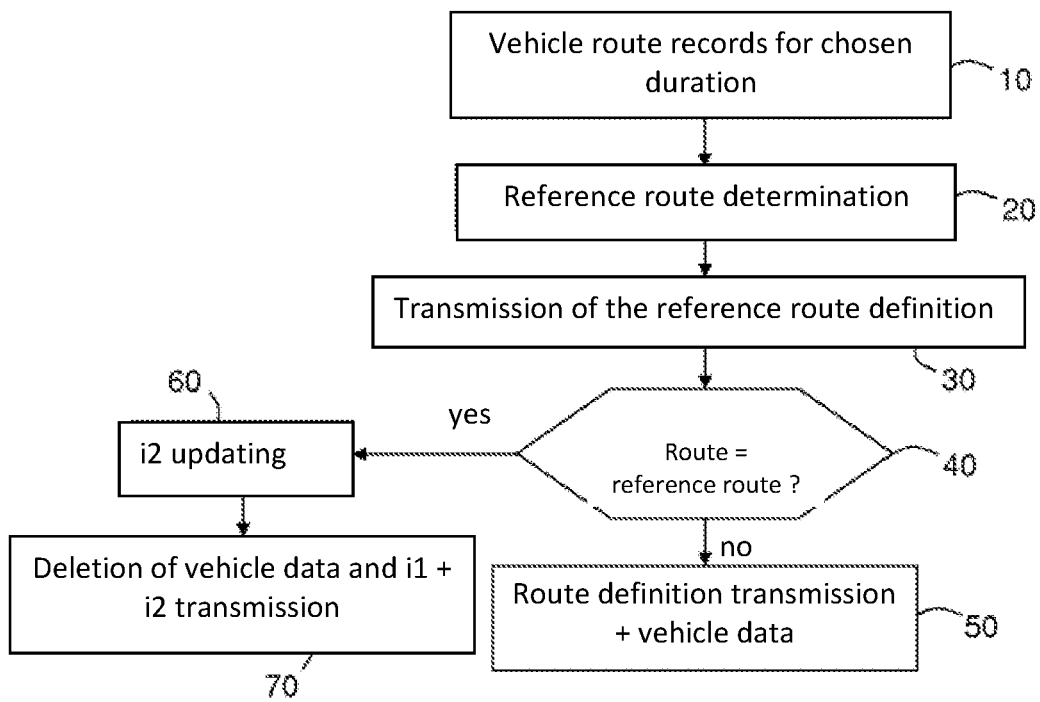

FIG. 2 schematically illustrates a non-limiting example of an algorithm implementing a monitoring method according to the invention.

In a sub-step 10, the definition of each route taken by vehicle V during the chosen duration is recorded.

In a sub-step 20, vehicle V determines a reference route taken most frequently from all of the route definitions recorded during the selected time.

In a sub-step 30, once the definition of the reference route is available, at least this definition of the reference route is transmitted by broadcast waves from vehicle V to the communication equipment EC.

Sub-steps 10 to 30 here constitute the first step of the monitoring method according to the invention.

In a sub-step 40, as soon as vehicle V has taken a new route, the definition of this new route is compared with the definition of the reference route which was previously determined in the first step.

If there is a difference between the definitions of the new route and the reference route ("no"), transmission is made in a sub-step 50, by broadcast waves, from vehicle V to the communication equipment EC, of the definition of the new route with predefined vehicle V data recorded during this new route.

On the other hand, in case of identity between the definitions of the new route and the reference route ("yes"), the possible second information i2 can be updated in a substep 60. Then, in a sub-step 70, it transmits, by means of broadcast waves from vehicle V to the communication equipment EC, the first information item i1 representative of the fact that the reference route has been used again, as well as the updated possible second information i2, and in vehicle V, the predefined data of the vehicle V, that were recorded during the reference route that was once again used, are deleted.

Note that in an alternative embodiment, the first information i1 could be transmitted in a sub-step 60, by broadcast waves, from the vehicle V to the communication equipment EC, and the predefined data of vehicle V that were recorded during the reference route that was once again used could be deleted in vehicle V. Then, in a sub-step 70, the possible second information i2 could be updated in the communication equipment EC, in particular as a function of the first information i1 received from vehicle V.

Substeps 40 to 70 here constitute the second step of the monitoring method according to the invention.

The invention claimed is:

1. A method of monitoring the transmission by broadcast waves of data of a vehicle to communication equipment, wherein the method comprises a first step, in which in said vehicle a reference route used most frequently in a chosen duration is determined, and at least one definition of said reference route is then transmitted by broadcast waves from said vehicle to said communication equipment, and a second step in which, in said vehicle, each definition of a new route taken by the the vehicle is compared to said definition of the reference route, and in the case of a difference, said definition of the new route with predefined data of said vehicle recorded during this new route is transmitted from said vehicle by broadcast waves to said communication equipment, while in the case of identity a first piece of information representative of the fact that said reference route has been used once again is transmitted by broadcast waves, from said vehicle to said communication equipment, and said predefined data of said vehicle recorded during said reference route used once again, are deleted in said vehicle.

2. The method according to claim 1, wherein said first information indicates that said reference route has been used again.

3. The method according to claim 1, wherein, in said second step, a second piece of information representative of an updated repeatability rate, is determined each time said reference route has been used again.

4. The method according to claim 3, wherein said repeatability rate is equal to a ratio a/(a+b), where a is equal to the product of the number of times said reference route has been traveled multiplied by the length of the the reference route, and b is equal to the sum of a and the sum of the number of times each route different from said reference route has been taken multiplied by the length of this different route.

5. The method according to claim 3, wherein, in said second step, when said communication equipment receives said second information from said vehicle, said second information is stored matched to an identifier of said vehicle.

6. The method according to claim 1, wherein each definition of a route comprises a geographical position of the beginning of said route, a geographical position at the end of said route, a length of said route, and an average speed of said vehicle on said route.

7. The method according to claim 1, wherein said chosen duration is between two weeks and four weeks.

8. The method according to claim 1, wherein said chosen duration is equal to three weeks.

9. A device for monitoring the transmission by broadcast waves of data of a vehicle to communication equipment, wherein the device comprises:
   i) analysis means arranged for determining in said vehicle, for a selected period of time, a reference route taken most frequently, and for triggering the transmission by broadcast waves, from said vehicle to said communication equipment, of at least one definition of said reference route, and
   ii) monitoring means arranged to compare in said vehicle each definition of a new route taken by the the vehicle with said definition of the reference route, and in case of difference, for triggering the transmission by broadcast waves, from said vehicle to said communication equipment, a definition of said new route with predefined data of said vehicle recorded during this new route, and in case of identity, for triggering the transmission by broadcast waves, from said vehicle to said communication equipment, of a first piece of information representative of the fact that said reference route has been used again, and deletion in said vehicle of said predefined data of said vehicle recorded during said reference route used once again used.

10. A vehicle comprising the monitoring device according to claim 9.

* * * * *